(12) United States Patent  (10) Patent No.: US 9,165,031 B2
McLean et al.  (45) Date of Patent: Oct. 20, 2015

(54) RETRIEVING STORED DATA USING A WEB SERVICE

(71) Applicant: Microsoft Corporation, Redmond, WA (US)

(72) Inventors: Michael T. McLean, Snoqualmie, WA (US); Alexandru Savescu, Issaquah, WA (US); Andrei Razvan Popov, Issaquah, WA (US); Kadambari Sinha, Seattle, WA (US); Biatrice M. Ambrosa, Redmond, WA (US); Pradeep Ganapathyraj, Bellevue, WA (US); Christopher A. Boyd, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 13/917,427

(22) Filed: Jun. 13, 2013

(65) Prior Publication Data

US 2014/0372367 A1   Dec. 18, 2014

(51) Int. Cl.
  *G06F 17/30* (2006.01)
  *G06F 3/00* (2006.01)
  *G06F 21/62* (2013.01)
  *G06F 21/30* (2013.01)
  *G06F 21/57* (2013.01)
  *H04N 21/258* (2011.01)
  *H04L 29/06* (2006.01)
  *H04L 29/08* (2006.01)

(52) U.S. Cl.
  CPC ........ *G06F 17/30424* (2013.01); *G06F 21/305* (2013.01); *G06F 21/57* (2013.01); *G06F 21/6218* (2013.01); *H04L 63/083* (2013.01); *H04L 67/02* (2013.01); *H04L 67/28* (2013.01); *G06F 17/30386* (2013.01); *G06F 2221/2111* (2013.01); *G06F 2221/2117* (2013.01); *G06F 2221/2119* (2013.01); *G06F 2221/2141* (2013.01); *G06F 2221/2151* (2013.01); *H04L 63/0281* (2013.01); *H04L 67/2823* (2013.01); *H04N 21/25875* (2013.01)

(58) Field of Classification Search
  CPC ................... G06F 17/30386; H04N 21/25875; H04N 21/472
  See application file for complete search history.

(56) References Cited

U.S. PATENT DOCUMENTS

| 8,891,483 | B2 * | 11/2014 | Connelly et al. ............. 370/331 |
| 2008/0133376 | A1 * | 6/2008 | Hill ................................. 705/26 |
| 2011/0026704 | A1 * | 2/2011 | Connelly et al. ............. 379/219 |
| 2011/0225143 | A1 | 9/2011 | Khosravy et al. |

(Continued)

OTHER PUBLICATIONS

Apple, Apple Support, "iOS: Connecting to Wi-Fi", https://support.apple.com/en-us, May 21, 2015.*

(Continued)

*Primary Examiner* — Cheryl Lewis
(74) *Attorney, Agent, or Firm* — Damon Rieth; Danielle Johnston-Holmes; Micky Minhas

(57) ABSTRACT

Retrieving stored data using a web service is provided. An access request from a user account may be received at a web service via a proxy. The web service may decode information received in the access request. The web service may then authorize the user account utilizing the decoded information. The web service may then determine a request type based on the access request. The web service may then send a response based on the determined request type, which is based on data retrieved from a data store.

20 Claims, 5 Drawing Sheets

(56) References Cited

U.S. PATENT DOCUMENTS

| | | | |
|---|---|---|---|
| 2012/0246190 A1 | 9/2012 | Surtani et al. | |
| 2012/0278449 A1* | 11/2012 | Wu et al. | 709/219 |
| 2012/0324418 A1 | 12/2012 | Fallon | |
| 2014/0108614 A1* | 4/2014 | Gunderson et al. | 709/219 |
| 2014/0157324 A1* | 6/2014 | Mao et al. | 725/54 |

OTHER PUBLICATIONS

Chappell, David, "Introducing OData", May 2011, Available at: http://msdn.microsoft.com/en-us/data/hh237663.aspx, 10 pages.

Ocull, Heather, "Server Reporting in PWA", Oct. 31, 2012, Available at: http://blogs.office.com/b/project/archive/2012/10/31/reporting-project-server-pwa-odata.aspx, 6 pages.

The Project Group, "Project Server 2013—What is New?", 2013, Available at: http://www.theprojectgroup.com/fileadmin/web_data/public-data/downloads/EPM_Versionen/Microsoft_Project_Server_2013_-_what_is_new_-_TPG_TheProjectGroup.pdf, 6 pages.

Office 2013, "ProjectData—Project 2013 OData Service Reference", Feb. 19, 2013, Available at: http://msdn.microsoft.com/en-us/library/office/jj163015.aspx, 7 pages.

Office 2013, "Project Server Programmability", Jul. 16, 2012, vailable at: http://msdn.microsoft.com/en-us/library/office/ms504195.aspx, 17 pages.

* cited by examiner

RETRIEVING STORED DATA USING A WEB SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer and software users have grown accustomed to user-friendly software applications that help them write, calculate, organize, prepare presentations and reports, and the like. Project management applications, for example, allow users to create reports from data retrieved using SQL queries which directly access a project database. However, with the advent of "cloud-based" computing, user access to server platforms for retrieving data is provided remotely on a software as a service basis from the cloud. As a result, these users no longer have direct access to required databases (e.g., SQL databases) which are typically utilized for retrieving data and generating reports. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for retrieving stored data using a web service. An access request from a user account may be received at a web service via a proxy. The web service may decode information received in the access request. The web service may then authorize the user account utilizing the decoded information. The web service may then determine a request type based on the access request. The web service may then send a response based on the determined request type, which is based on data retrieved from a data store.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for retrieving stored data using a web service. An access request from a user account may be received at a web service via a proxy. The web service may decode information received in the access request. The web service may then authorize the user account utilizing the decoded information. The web service may then determine a request type based on the access request. The web service may then send a response based on the determined request type, which is based on data retrieved from a data store.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
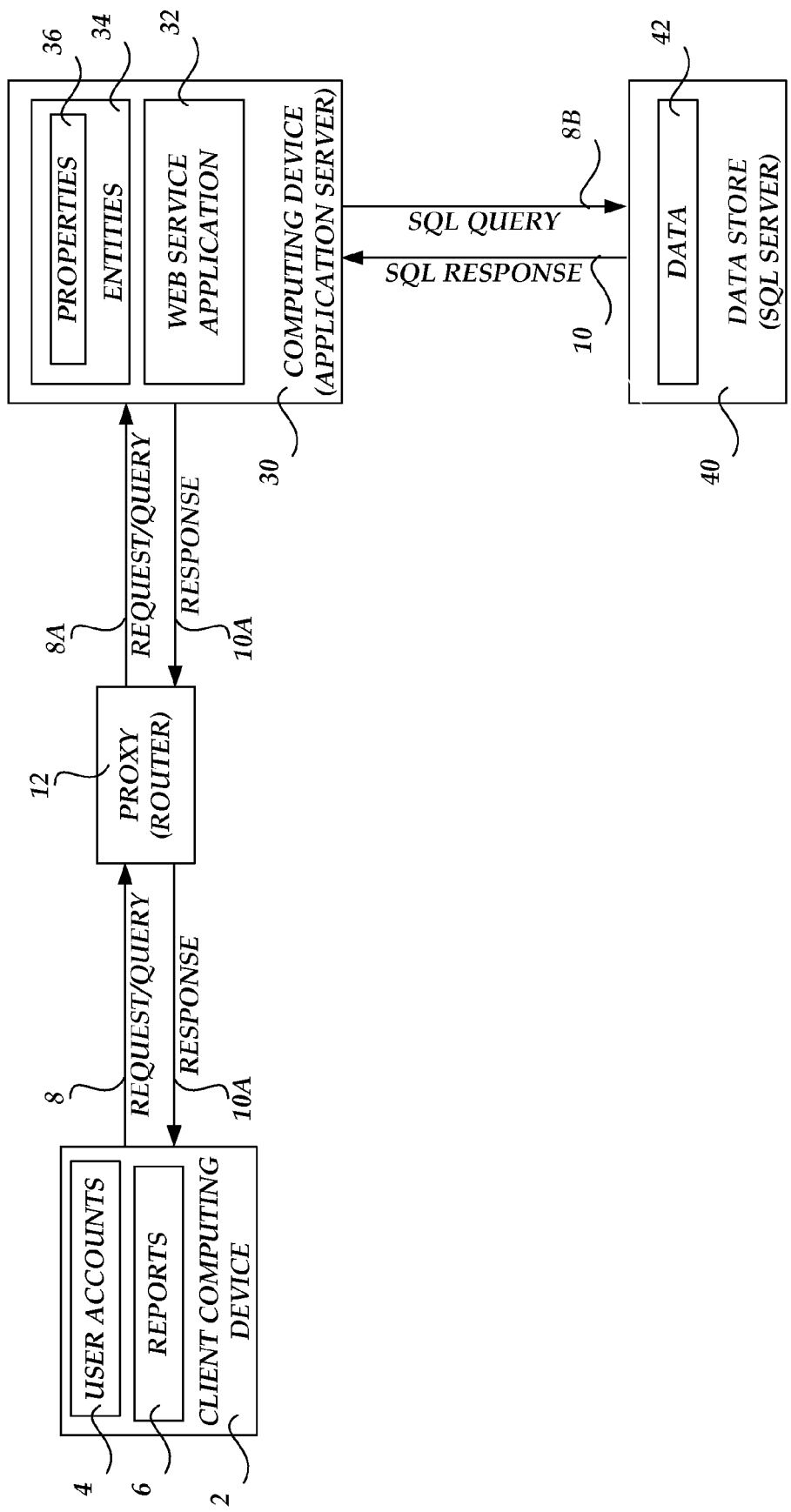
FIG. 1 is a block diagram illustrating a network architecture for retrieving stored data using a web service, in accordance with an embodiment.

Referring now to the drawings, in which like numerals represent like elements through the several figures, various aspects of the present invention will be described. FIG. 1 is a block diagram illustrating a network architecture for retrieving stored data using a web service, in accordance with an embodiment. The network architecture includes a client computing device 2 which is in communication with a proxy 12. The proxy 12, which may comprise a router, is in communication with the client computing device 2 and a computing device 30. The computing device 30, which may comprise an application server, is in communication with the proxy 12 and a data store 40. The data store 40 may comprise a Structured Query Language ("SQL") server.

The client computing device 2, may store user accounts 4 and reports 6. In accordance with an embodiment, the user accounts 4 may comprise access credentials for multiple tenants of a project service which may store data related to thousands of customers. For example, on a given client device, multiple user accounts may exist which link to separate tenants. It should be also understood, that in accordance with an embodiment, a customer may deploy an on-premises version of the project service which could be specific for a single customer.

It should be appreciated that the project service may be configured such that each tenant (e.g., a customer or company) may only be provided access to specific data related to their organization. The reports 6 may comprise project data reports which may be created from data 42 stored on the data store 40. The client computing device 2 may be configured to transmit a request/query 8 to the proxy 12. The request/query 8 may comprise a hypertext transfer protocol ("HTTP") for accessing the computing device 30 via the proxy 12. It should be understood that in accordance with this embodiment, the client computing device 2 may only access the proxy 12 and thus may not have access to the computing device 30 (or any services provided thereon). The request/query 8 may also include a user request for data from the data store 40. The client computing device 2 may also be configured to receive a response 10A from the computing device 30 via the proxy 12.

The proxy 12 may be configured to receive the request/query 8 from the computing device 2 which is used to authenticate a user account. The proxy 12 may further be configured to append header information (not shown) which is utilized to create an "enriched" request/query 8A to the computing device 30. In accordance with this embodiment, the appended header information may include an original uniform resource locator ("URL"). It should be understood that the client computing device 2 may maintain an open connection with the proxy 12 which returns results from the computing device 30 (i.e., the application server). The appended header information may further include the user account of the requesting user (which may be used by the computing device 30 for authorization purposes) and a tracking globally unique identifier ("GUID") (which may be used to mark entries for a single request in a similar fashion for multiple computing devices). The proxy 12 is also configured to receive the response 10A from the computing device 30 for delivery to the client computing device 2.

The computing device 30 may comprise a web service application 32. The web service application 32 is configured to provide a service which receives the request/query 8A from the proxy 12, sends an SQL query 8B for retrieving requested data 42 from the data store 40, receives an SQL response 10 comprising the requested data 42 and sends the response 10A to the proxy 12 (for delivery to the client computing device 2). In accordance with the present embodiment, the web service application 32 may utilize the Open Data Protocol ("OData") protocol. As should be understood by those skilled in the art, the OData protocol is a data access protocol designed to provide standard create, read, update and delete ("CRUD") access to a data source (including, but not limited to, SQL databases) via a Web or cloud service. It should understood be however, that the embodiments described herein are not limited to the OData protocol. For example, in some embodiments, the web service application 32 may utilize a Representational State Transfer ("REST") web Application Programming Interface ("API") which is also known as a RESTful web API. REST is a style of software architecture for distributed systems such as the World Wide Web. RESTful web APIs are web APIs implemented using HTTP and REST principles. In accordance with the present embodiment, the web service application 32 may be further be configured to utilize the original URL (discussed above) when building navigational links in the response 10A so as to ensure the links are usable by the client computing device 2. The web service application 32 may further be configured to utilize the user accounts 4 for authorizing access to predetermined data in the data store 40. The web service application 32 may further be configured to decode the header information received from the proxy 12, utilize this information to authorize user requests (e.g., the request/query 8 received from one of the user accounts 4 on the client computing device 2) and build the response 10A according to user permissions for accessing the data store 40. In authorizing user requests, the web service application 32 may utilize the OAuth standard. As known to those skilled in the art, OAuth is an open standard for authorization which provides a method for clients to access server resources on behalf of a resource owner (such as a different client or an end-user). OAuth also provides a process for end-users to authorize third-party access to their server resources without sharing their credentials (typically, a username and password pair), using user-agent redirections. It should be understood however, that other authorization standards may also be utilized. In accordance with this embodiment, the web service application 32 may comprise project management server software which stores project data (i.e., the data 42), which may include projects, tasks and resources, in a central SQL server database (i.e., the data store 40), protected from unauthorized access and corruption. For example, the web service application 32 may comprise the PROJECT SERVER project management software from MICROSOFT CORPORATION of Redmond, Wash. It should be appreciated however, that other project management software from other manufacturers also may be utilized in accordance with the various embodiments described herein. Those skilled in the art should further appreciate that in accordance with various embodiments, the web service application 32 is not limited to project management server software but may comprise any software which provides a service enabling secure access to data stored in a centralized database.

The computing device 30 may also comprise a defined set of entities 34. The entities 34 may be the result of a model of the data store 40 which is created using logical relationships. The entities 34 may be presented to a user associated with the user accounts 4 after the user had attempted to connect and successfully authenticated to the web service provided by the computing device 30. It should be appreciated that the entities 34 presented from the aforementioned web service provides a schema which facilitates the creation of reports by users without requiring knowledge of SQL or SQL extensions including, but not limited to, Transact-SQL ("T-SQL"). It should be understood that a model may be utilized for the building of metadata that describes a schema of the results returned by the web service application 32. The metadata may be separated into classifications which comprise properties 36. In particular, the metadata may be separated entity properties (i.e., entities that are included in the web service application 32) and dynamic entity properties (i.e., entities added by customers (e.g., custom fields)). It should be understood, in accordance with an embodiment, the entities 34 and their non-dynamic properties may be compiled from a markup language file (e.g., "XML") in order to facilitate editing. In this manner, the model may be altered quickly and easily when reacting to customer feedback.

It should be further understood that the web service application 32 may be configured to consider markup language (e.g., XML) defined in the model and add custom definitions as properties to the appropriate entity definition. It should be appreciated that by utilizing the entities 34 and the properties 36, end-users may add new fields to an SQL database without needing to modify SQL statements in order to report on them. It should be further appreciated that program code defining the model does not need to be re-compiled after custom fields have been added to the data store 40. Thus, the custom fields are made available "on-the-fly" thereby allowing a user to take advantage of them immediately. The entities 34 and the properties 36 will be described in greater detail below with respect to FIGS. 2-3.

Figure 2:
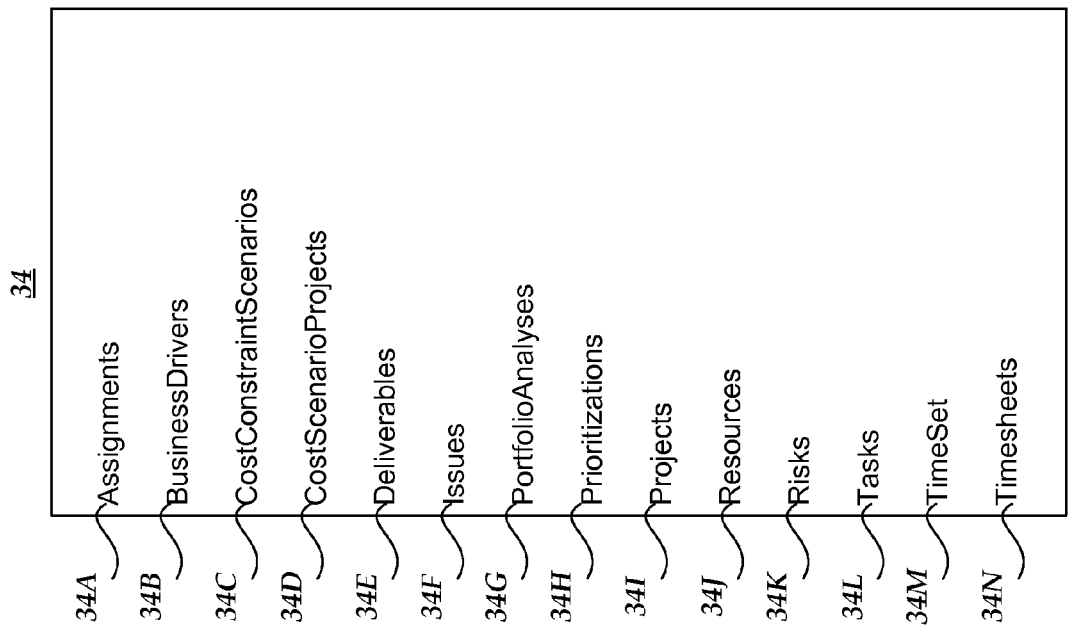
FIG. 2 is a block diagram illustrating a set of entities utilized by the web service of FIG. 1, in accordance with an embodiment.

FIG. 2 is a block diagram illustrating a set of entities 34 utilized by the web service application 32, in accordance with an embodiment. The set of entities 34 may comprise individual entities 34A-34N which are made available via the web service 32 and which may be utilized in the creation of reports. For example, the Projects entity 34I may comprise various fields which may be utilized to create a project report which may include project start and end dates, costs (including overtime costs), project name, project budget, project description, project duration, as well as other information.

Figure 3:
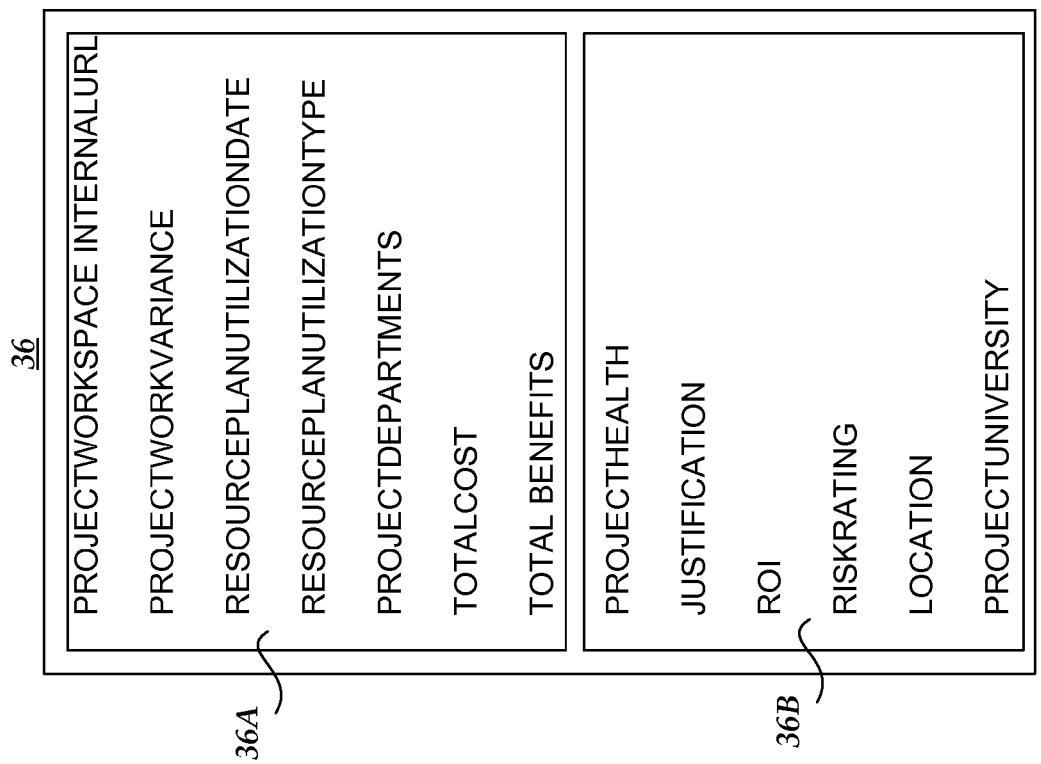
FIG. 3 is a block diagram illustrating entity properties utilized by the web service of FIG. 1, in accordance with an embodiment.

FIG. 3 is a block diagram illustrating entity properties 36 utilized by the web service application 32, in accordance with an embodiment. The entity properties 36 may comprise static entity properties 36A and dynamic entity properties 36B. The dynamic entity properties 36B may comprise one or more custom field definitions added as properties to a corresponding entity definition. For example, the dynamic entity properties 36B may comprise custom field definitions added as properties to the Projects entity 34I shown in FIG. 2. It should be understood that the web service application 32 may be configured to receive dynamic queries, from the user accounts 4, which include a query of the added custom field definitions. It should also be understood that, in addition to receiving the dynamic queries, the web service application 32 also returns a response with the requested data (i.e., the response 10A).

Figure 4:
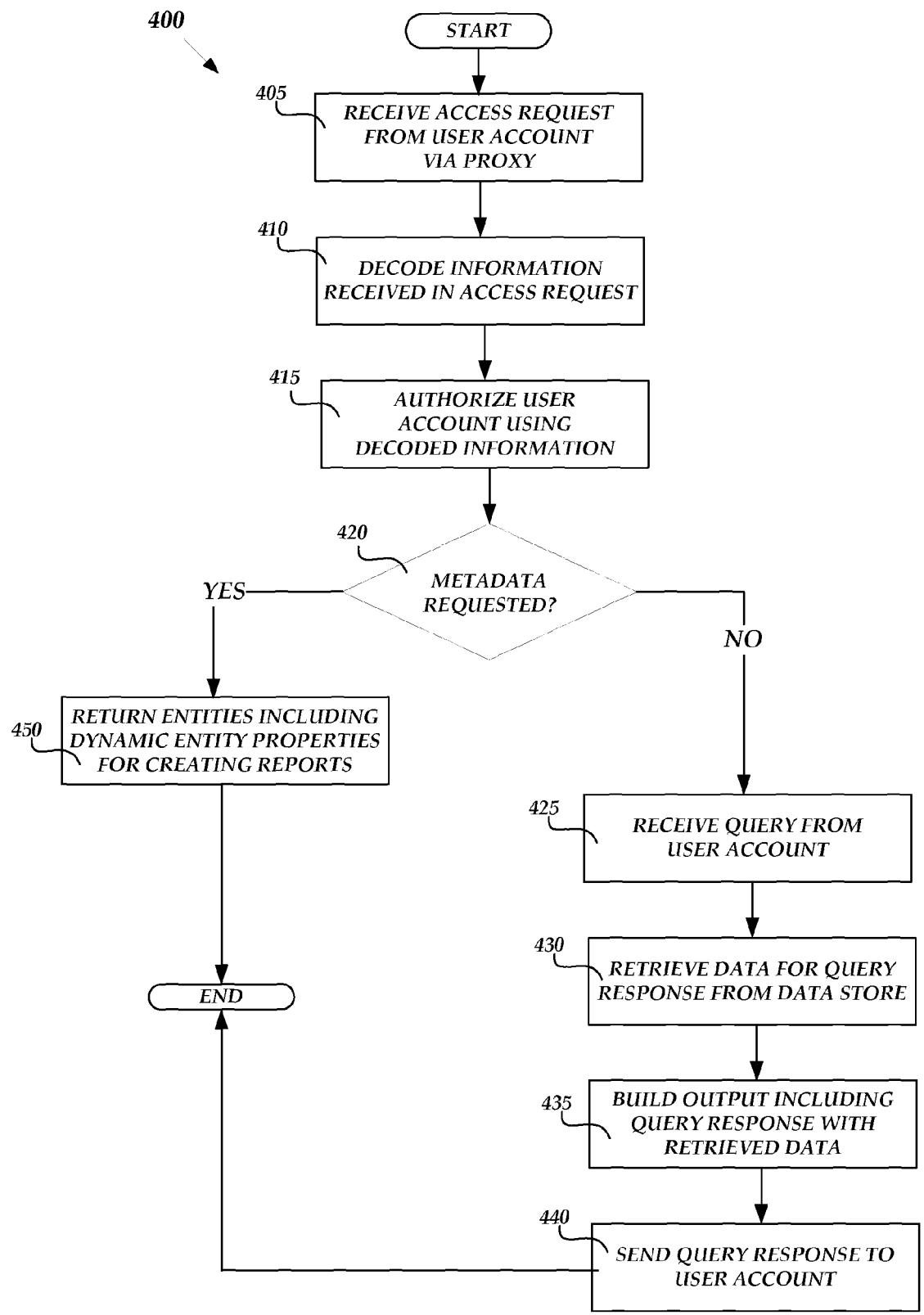
FIG. 4 is a flow diagram illustrating a routine for retrieving stored data using a web service, in accordance with an embodiment.

FIG. 4 is a flow diagram illustrating a routine 400 retrieving stored data using a web service, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 400 begins at operation 405, where the web service application 32, executing on the computing device 30, may receive an access request from a user account via the proxy 12. For example the web service application 32 may receive an access request from a user account 4 in the request/query 8A received from the proxy 12.

From operation 405, the routine 400 continues to operation 410, where the web service application 32, executing on the computing device 30, may decode information received in the request/query 8A from the proxy 12.

From operation 405, the routine 400 continues to operation 415, where the web service application 32, executing on the computing device 30, may authorize a user account 4 using the decoded information received in the request/query 8A from the proxy. As discussed above with respect to FIG. 1, the user account authorization may be limited to predetermined data in the data store 40.

From operation 415, the routine 400 continues to operation 420, where the web service application 32, executing on the computing device 30, may determine whether metadata has been requested in the access request received at operation 405. If, at operation 420, the web service application 32 determines that metadata has not been requested, then the routine 400 continues to operation 425. If, at operation 420, the web service application 32 determines that metadata has been requested, then the routine 400 branches to operation 450.

At operation 425, the web service 32, executing on the computing device 30, may receive a query from a user account 4. For example, the query may be received from the request/query 8A sent by the proxy 12. The query may be based on the entities 34 and include a dynamic query which comprises a query of the one or more custom field definitions in the dynamic entity properties 36B.

From operation 425, the routine 400 continues to operation 430, where the web service application 32, executing on the computing device 30, may retrieve the data from the data store 40. In order to retrieve the data, the web service application 32 may, for example, create the SQL query 8B by translating entity and property names utilized in the request/query 8A to SQL, send the SQL query 8B to the data store 40 and retrieve SQL data from the data store 40. The web service application 32 may then utilize the retrieved SQL data in building the response 10A for a requesting user account 4 on the client computing device 2.

From operation 430, the routine 400 continues to operation 435, where the web service application 32, executing on the computing device 30, may build an output including the response 10A using the retrieved data from the data store 40.

From operation 435, the routine 400 continues to operation 440, where the web service application 32, executing on the computing device 30, may send the response 10A to a user account 4 on the computing device 2. From operation 440, the routine 400 then ends.

Returning now to operation 420, upon a determination that metadata has been requested, the routine 400 branches to operation 450, where the web service application 32, executing on the computing device 30, may return entities 34, including static entity properties 36A and dynamic entity properties 36B, for creating the reports 6. As discussed above with respect to FIG. 3, the dynamic entity properties 36B may comprise one or more custom field definitions added as properties to a corresponding entity definition (e.g., a Projects entity). From operation 450, the routine 400 then ends.

Figure 5:
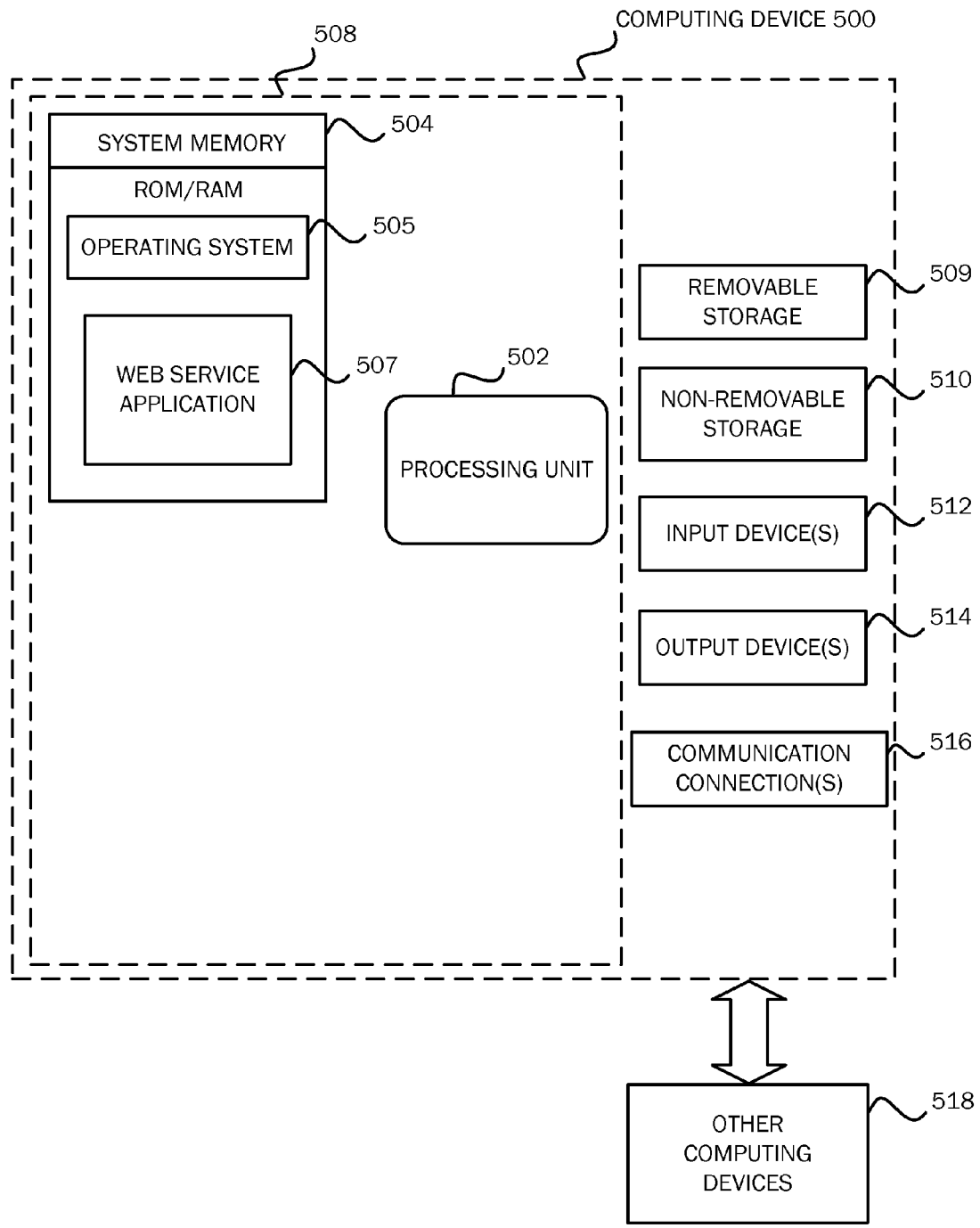
FIG. 5 is a simplified block diagram of a computing device with which various embodiments may be practiced.

FIG. 5 and the associated description provide a discussion of an operating environment in which embodiments of the invention may be practiced. However, the devices and systems illustrated and discussed with respect to FIG. 5 are for purposes of example and illustration and are not limiting of a vast number of computing device configurations that may be utilized for practicing embodiments of the invention, described herein.

FIG. 5 is a block diagram illustrating example physical components of a computing device 500 with which various embodiments may be practiced. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and web service application 507. Operating system 505, for example, may be suitable for controlling the computing device 500's operation and, in accordance with an embodiment, may comprise the WINDOWS operating systems from MICROSOFT CORPORATION of Redmond, Wash. The web service application 507, for example, may comprise functionality for performing routines including, for example, retrieving stored data using a web service, as described above with respect to the operation in routine 400 of FIG. 4. It should be understood, however, that the embodiments described herein may also be practiced in conjunction with other operating systems and application programs and further, is not limited to any particular application or system.

The computing device 500 may have additional features or functionality. For example, the computing device 500 may also include additional data storage devices (removable and/or non-removable) such as, for example, magnetic disks, optical disks, solid state storage devices ("SSD"), flash memory or tape. Such additional storage is illustrated in FIG.

5 by a removable storage 509 and a non-removable storage 510. The computing device 500 may also have input device(s) 512 such as a keyboard, a mouse, a pen, a sound input device (e.g., a microphone) for voice input, a touch input device for receiving gestures, an accelerometer or rotational sensor, etc. Output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method of retrieving stored data using a web service, comprising:
   receiving, by the web service, an access request from a user account via a proxy;
   decoding, by the web service, information received in the access request to form decoded information;
   authorizing, by the web service, the user account utilizing the decoded information, wherein authorizing includes at least authorizing a user to access a plurality of entities;
   receiving, by the web service, a query for at least one of the plurality of entities;
   translating the query to a data store query, wherein the data store query is in a predefined language;
   accessing, by the web service, data from a data store using the data store query; and
   sending, by the web service, a response to the query.

2. The method of claim 1, wherein authorizing, by the web service, the access request utilizing the decoded information, comprises authorizing the user account for access to predetermined data in the data store.

3. The method of claim 1, wherein:
   wherein the predefined language is Structured Query Language (SQL); and
   wherein the data store is an SQL server.

4. The method of claim 1 further comprising: determining that the request type comprises a metadata request; and
   returning, by the web service, the plurality of entities to the user account, the plurality of entities being utilized for creating reports.

5. The method of claim 4, further comprising: returning, by the web service, the plurality of entities to the user account, the plurality of entities being utilized for creating reports; and
   returning one or more dynamic entity properties, the dynamic entity properties comprising one or more custom field definitions added as properties to a corresponding entity definition.

6. The method of claim 5, wherein returning, by the web service, the plurality of entities to the user account, the plurality of entities being utilized for creating reports, comprises returning one or more static entity properties.

7. The method of claim 1, wherein the plurality of entities includes at least one entity selected from the group consisting of: Assignments, BusinessDrivers, CostConstraintScenarios, CostScenarioProjects, Deliverables, Issues, PortfolioAnalyses, Prioritizations, Projects, Resources, Risks, Tasks, TimeSet, and Timesheets.

8. A computing device comprising:
a memory for storing executable program code; and
a processor, functionally coupled to the memory, the processor being responsive to computer-executable instructions contained in the program code and operative to:
receive an access request from a user account via a proxy, the access request comprising information;
decode the information received in the access request to form decoded information;
authorize the access request utilizing the decoded information;
determine a request type based on the access request;
send a response based on the determined request type, the response based on data retrieved from a data store;
receive a query based on at least one of a plurality of entities from the user account;
retrieve data for providing a response to the query from the data store, wherein retrieving data for providing the response includes using a predefined language that is different from a language of the query;
build an output comprising the response to the query using the retrieved data from the data store; and
send a response to the query to the user account based on the data retrieved from the data store.

9. The computing device of claim 8, wherein the processor, in authorizing the access request utilizing the decoded information, is operative to authorize the user account for access to predetermined data in the data store.

10. The computing device of claim 8, wherein the processor, in retrieving data for providing a response to the query from the data store, is operative to:
create a Structured Query Language (SQL) query by translating at least one of an entity name or a property name in the query from a first language to a second language utilized by the data store, the second language comprising SQL;
send the SQL query to an SQL server; and
retrieve SQL data from the SQL server.

11. The computing device of claim 8, wherein the processor, upon determining that the request type comprises a metadata request, is further operative to return the plurality of entities to the user account, the plurality of entities being utilized for creating reports.

12. The computing device of claim 11, wherein the processor, in returning the plurality of entities to the user account, the plurality of entities being utilized for creating reports, is operative to return one or more dynamic entity properties, the dynamic entity properties comprising one or more custom field definitions added as properties to a corresponding entity definition.

13. The computing device of claim 11, wherein the processor, in returning the plurality of entities to the user account, the plurality of entities being utilized for creating reports, is operative to return one or more static entity properties.

14. The computing device of claim 8, wherein the plurality of entities includes at least one entity selected from the group consisting of: Assignments, BusinessDrivers, CostConstraintScenarios, CostScenarioProjects, Deliverables, Issues, PortfolioAnalyses, Prioritizations, Projects, Resources, Risks, Tasks, TimeSet, and Timesheets.

15. A computing system comprising at least one computer processor operatively coupled to a computer-readable storage device storing computer executable instructions which, when executed, will cause the computing system to perform a method of retrieving stored data using a web service, the method comprising:
receiving an access request from a user account via a proxy;
decoding information received in the access request;
authorizing the user account for access to predetermined data in a data store utilizing the decoded information, wherein the predetermined data comprises a set of entities of a web server application, and further wherein the set entities comprise individual entities that are used in the creation of reports;
determining a request type based on the access request; and
sending a response based on the determined request type, the response based on data retrieved from the data store.

16. The computer system of claim 15, upon determining that the request type comprises a query, further comprising:
receiving, by the web service, a query based on at least one of a plurality of entities, from the user account;
retrieving, by the web service, data for providing a response to the query from the data store;
building an output comprising the response to the query using the retrieved data from the data store; and
sending, by the web service, a response to the query to the user account based on the data retrieved from the data store.

17. The computer system of claim 16, wherein retrieving data for providing a response to the query from the data store comprises:
creating a Structured Query Language (SQL) query by translating at least one of an entity name or a property name in the query from a first language to a second language utilized by the data store, the second language comprising SQL;
sending the SQL query to an SQL server; and
retrieving SQL data from the SQL server.

18. The computer system of claim 15, upon determining that the request type comprises a metadata request, further comprising returning, by the web service, a plurality of entities to the user account, the plurality of entities being utilized for creating reports.

19. The computer system of claim 18, wherein returning a plurality of entities to the user account, the plurality of entities being utilized for creating reports, comprises returning one or more dynamic entity properties, the dynamic entity properties comprising one or more custom field definitions added as properties to a corresponding entity definition.

20. The computer system of claim 18, wherein returning a plurality of entities to the user account, the plurality of entities being utilized for creating reports, comprises returning one or more static entity properties.

* * * * *